July 12, 1955
R. L. CAMPBELL
2,712,753
FREQUENCY MEASURING APPARATUS
Filed July 10, 1950
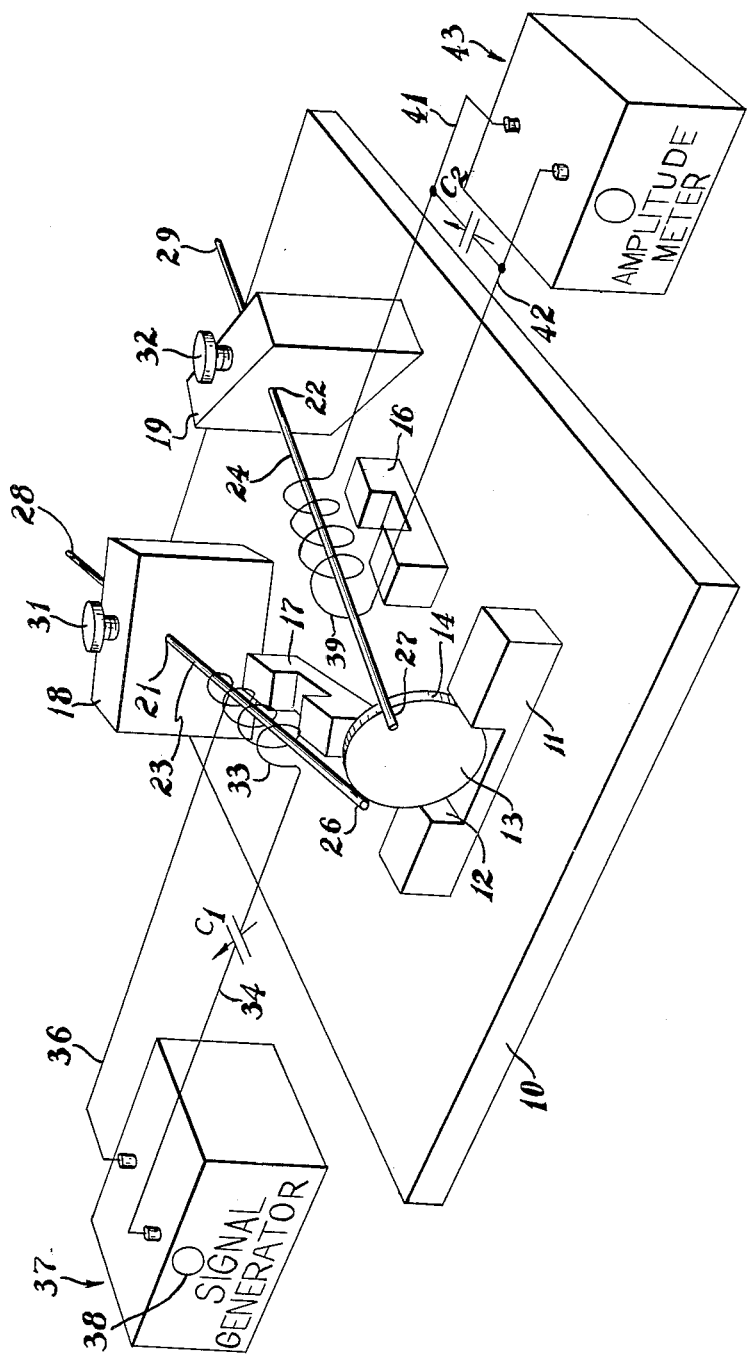
INVENTOR.
ROBERT L. CAMPBELL
BY Marvin Moody
ATTY.

2,712,753
FREQUENCY MEASURING APPARATUS

Robert L. Campbell, Glendale, Calif., assignor to Collins Radio Company, Cedar Rapids, Iowa, a corporation of Iowa Application July 10, 1950, Serial No. 172,984

4 Claims. (Cl. 73—67)

This invention relates in general to means for measuring frequency, and in particular to a frequency meter for measuring mechanical vibration.

It is oftentimes desirable to measure the resonant frequency of a mechanical vibrating member, and this has previously been rather difficult. With the use of mechanical filters wherein a plurality of relatively thin discs are mounted together to form a band-pass filter, the composite characteristics of the completed filter depends upon the resonant frequency of the individual discs. In order to obtain a finished filter which has characteristics that may be predetermined, it is necessary that the frequency of the individual sections be known, and in order to get a smooth band-pass curve, each section of the filter should have the same resonant frequency as the other sections. It is practically impossible to obtain vibrating discs which oscillate at the same frequency by using physical measurements. Previously a plurality of discs, which were as nearly alike as possible, were connected to form a filter with the hope that the completed filter would have satisfactory characteristics. For more detailed description of electro-mechanical filters, reference may be had to the patent application of M. L. Doelz, Serial Number 70,829, which was filed on January 14, 1949, now Patent No. 2,615,981, entitled "Electromechanical Filters."

It is an object of this invention, therefore, to provide means for very accurately adjusting the frequency of a vibrating mechanical member.

Another object of this invention is to provide means which makes it possible to obtain a plurality of vibrating mechanical members which have the same resonant frequency independent of their physical dimensions.

To provide means making it possible to obtain a smooth band-pass filter made up of a plurality of mechanical vibrators is another object of this invention.

A feature of this invention is found in the provision for a magnetostrictive input means which induces vibrations in an object and magnetostrictive pickup means which receives an output from the object and gives an indication of the amplitude and frequency of the vibrations.

Further objects, advantages, and features of this invention will become apparent from the following description and claims when read in view of the drawings, in which the figure is a schematic diagram illustrating the respective spatial relationships among the various components of the invention.

With reference to the figure, a base member 10 of a generally rectangular shape supports thereon a holding bracket 11 which is of a generally U-shape having formed therein an opening 12 adapted to receive a disc 13. The bracket 11 may be formed of Bakelite or other suitable material. The disc 13 is easily retained in the holding bracket 11 because the finite thickness 14 of the disc engages the inner edges of the bracket 11 to obtain vertical stability. The disc 13, however, is not wedged into the holding bracket 11 and thus mechanical vibrations induced in the disc 13 will not be materially damped. The outer edge of the disc 13 is a point of maximum motion for transverse vibrations, and thus to obtain the free resonant frequency of the disc, substantial damping should not occur. Also mounted on the member 10 are a pair of polarizing magnets 16 and 17, respectively.

A pair of upright brackets 18 and 19 are mounted on the member 10 and have holes 21 and 22 formed therethrough. A pair of magnetostrictive rods 23 and 24 pass through the openings 21 and 22, respectively, and have their ends 26 and 27 in frictional engagement with the disc 13. The opposite ends 28 and 29 extend through the members 18 and 19, respectively. The distance from the members 18 and 19, respectively, to the ends 26 and 27 should be adjusted to a value such that an antinode in the vibration mode of the rod occurs adjacent the disc. A pair of thumb screws 31 and 32 are threadedly received into the members 18 and 19 and clamp the rods 23 and 24 to the members 18 and 19. The rods 23 and 24 may be of any suitable magnetostrictive material as, for example, nickel. A first inductive coil 33 is supported about the rod 23 adjacent the magnet 17 and has its leads 34 and 36 connected to a suitable signal generator 37. A condenser $C_1$ is connected in series with a coil 33 to tune the energizing circuit to the signal generator. The signal generator 37 has frequency varying means 38 for adjusting the frequency of the output signal to any desired value. A coil 39 fits about the rod 24 adjacent the magnet 16. Leads 41 and 42 are connected to the ends of the coil 39 and remove an output therefrom. A second condenser $C_2$ is in parallel with coil 39 to tune the output circuit to approximately the frequency of the generator output. An amplitude meter 43 receives the output furnished by the leads 41 and 42 and gives an indication of the amplitude of the incoming signal.

In operation, a disc 13 of unknown resonant frequency is inserted into the holding bracket 11 and the rods 23 and 24 are spring urged to contact the edge 14 of the disc. The variable condensers $C_1$ and $C_2$ are adjusted to tune the input and output circuits to approximately the frequency of the signal generator. The output of the signal generator 37 in cooperation with the output of the biasing magnet 17 and coil 33 induce vibrations in the rod 23. The vibrations induced in the rod 23 cause the disc 13 to vibrate. The rod 24 is caused to vibrate because of the mechanical connection with the disc 13, and a signal is generated in the coil 39 due to the vibrations of the rod 24. The amplitude of these vibrations is indicated by the meter 43.

As the frequency of the signal generator 37 is varied by adjusting the means 38, it will be noted that the output from coil 39 will be maintained at a threshold level until a resonant frequency, or some harmonic thereof is reached. Since the Q of metallic discs, such as illustrated, is very high, the frequency response is very sharp and the point of resonance may be very accurately measured. Thus if the frequency of the signal generator is varied from 90,000 to 110,000 cycles per second, the output of the meter 43 will be substantially constant until a point of resonance is reached. If, for example, the disc 13 is resonant at 100,000 cycles, a marked increase in output will be obtained at this frequency.

If the resonant frequency of the disc is other than the desired frequency it may be manually removed and honed or lapped on a suitable abrasive and then be re-inserted into the testing apparatus. The new resonant frequency caused by the change in the physical dimensions may be quickly observed and more honing may be done until the exact desired frequency is obtained. The insertion of the disc into the testing equipment is very quickly accomplished, and therefore, the adjustment may be very swiftly made. In this manner the disc may be adjusted very accurately and swiftly to the desired frequency. Since it is the resonant frequency of the disc which is important, rather than the exact physical dimensions, this apparatus makes it possible to obtain a plurality of discs which have identical frequency response. Thus, when a plurality of the discs are assembled to form a composite filter, the frequency response of the completed filter will be very smooth and the discontinuities generally present in the frequency curve will be eliminated.

Although this invention has been described and illustrated with respect to vibrating discs, it is easily adaptable to other shaped members as, for example, rectangular or other shaped bodies. The only change that need be made is in the holding bracket 11 which may be formed to receive the desired shape.

The big advantage of this invention is that it makes it very easy and quick to obtain the frequency response of a vibrating member.

Although this invention has been described with respect to a preferred embodiment thereof, it is not to be so limited as changes and modifications may be made therein which are within the full intended scope of the invention as defined by the appended claims.

I claim:

1. Means for quickly and accurately measuring the resonant frequency of a vibrating disc for determining its relation to a desired resonant frequency comprising, a holding bracket for detachably receiving said disc therein, first holding means, a magnetostrictive rod retained by said first holding means and having one end thereof adapted to frictionally engage the periphery of said disc, inductive coupling means adjacent said first magnetostrictive rod, a first polarizing magnet adjacent said coupling means, a radio frequency generator connected to said first inductive means, a second holding means, a second magnetostrictive rod retained by said second holding means and having one end thereof adapted to frictionally engage the periphery of said disc, second inductive pick-off means adjacent said second magnetostrictive rod, a second polarizing magnet adjacent said second inductive means, and amplitude indicating means connected to said second inductive means.

2. Means for measuring the frequency of a plate-like member comprising, a holding bracket adapted to supportingly engage the edge of said member, a pair of magnetostrictive rods adapted for lateral frictional engagement with the edge of said member adjacent the first ends of said rods, first and second supporting means connected adjacent the second ends of said rods, first magnetostrictive inducing means coupled to one of said rods, second magnetostrictive pick-up means coupled to the other of said rods, a variable frequency generator connected to said inducing means, and an amplitude meter connected to said pick-up means.

3. Means for measuring the resonant frequency of a vibrating disc so it may be altered to a desired resonant frequency comprising, a holding bracket for detachably receiving said disc therein, first holding means, a first magnetostrictive rod extending through said first holding means and in contact therewith, one end of said first magnetostrictive rod frictionally engageable with the edge of said disc, a variable frequency generator, a coil disposed about said first magnetostrictive rod receiving an input from said signal generator, a second holding means, a second magnetostrictive rod extending through said second holding means and attached thereto, one end of said second magnetostrictive rod frictionally engageable with the edge of said disc, an output coil wound about said second magnetostrictive rod, and an amplitude meter connected to said output coil to indicate the amplitude of vibration of the disc.

4. Apparatus for determining the resonant frequency of a thin vibrating member comprising support means having spaced apart shoulders adapted to supportingly engage the peripheral edge of said member, a first magnetostrictive rod supported adjacent one of its ends and extending toward said support means, said first rod adapted to yieldingly engage in frictional contact the peripheral edge of said member, a second magnetostrictive rod supported adjacent one of its ends and extending toward said support means, said second rod adapted to yieldingly engage in frictional contact the peripheral edge of said member, a polarizing magnet adjacent each of said rods, an input coil supported coaxially with said first rod and adjacent one of said magnets, an output coil supported coaxially with said second rod and adjacent the other of said magnets, a variable frequency signal generator electrically connected to said input coil for energizing said first rod and vibrating said member, and an indicator electrically connected to said output coil for indicating the amplitude of vibrations of said second rod.

References Cited in the file of this patent

UNITED STATES PATENTS

| | | |
|---|---|---|
| 2,105,479 | Hayes | Jan. 18, 1938 |
| 2,280,226 | Firestone | Apr. 21, 1942 |
| 2,320,390 | Shmurak | June 1, 1943 |
| 2,384,716 | Wengel | Sept. 11, 1945 |
| 2,439,131 | Firestone | Apr. 6, 1948 |
| 2,461,543 | Gunn | Feb. 15, 1949 |
| 2,484,623 | Heising | Oct. 11, 1949 |
| 2,486,984 | Rowe | Nov. 1, 1949 |
| 2,490,273 | Kean | Dec. 6, 1949 |
| 2,615,981 | Doelz | Oct. 28, 1952 |